United States Patent
Lee et al.

(10) Patent No.: US 11,539,487 B2
(45) Date of Patent: *Dec. 27, 2022

(54) METHOD OF RECEIVING PHASE TRACKING REFERENCE SIGNAL BY USER EQUIPMENT IN WIRELESS COMMUNICATION SYSTEM AND DEVICE FOR SUPPORTING SAME

(71) Applicant: LG ELECTRONICS INC., Seoul (KR)

(72) Inventors: Kilbom Lee, Seoul (KR); Jiwon Kang, Seoul (KR); Kijun Kim, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

This patent is subject to a terminal disclaimer.

(21) Appl. No.: 17/164,916

(22) Filed: Feb. 2, 2021

(65) Prior Publication Data
US 2021/0167921 A1 Jun. 3, 2021

Related U.S. Application Data

(63) Continuation of application No. 16/065,055, filed as application No. PCT/KR2018/004717 on Apr. 24, 2018, now Pat. No. 10,951,374.

(60) Provisional application No. 62/489,431, filed on Apr. 24, 2017, provisional application No. 62/542,340, filed on Aug. 8, 2017.

(51) Int. Cl.
*H04L 5/00* (2006.01)
*H04L 1/00* (2006.01)
*H04W 72/04* (2009.01)

(52) U.S. Cl.
CPC .............. *H04L 5/0051* (2013.01); *H04L 1/00* (2013.01); *H04L 1/0009* (2013.01); *H04L 5/00* (2013.01); *H04W 72/04* (2013.01); *H04W 72/042* (2013.01); *H04W 72/044* (2013.01)

(58) Field of Classification Search
CPC ... H04L 5/0048; H04L 5/0051; H04L 5/0053; H04L 5/005; H04L 27/2613; H04W 72/042; H04W 24/04
See application file for complete search history.

(56) References Cited

U.S. PATENT DOCUMENTS 10,951,374 B2 * 3/2021 Lee .................... H04L 5/0051
2008/0101492 A1 5/2008 Gregoire et al.
(Continued)

FOREIGN PATENT DOCUMENTS

| CN | 104579545 A | 4/2015 |
|---|---|---|
| WO | WO 2016/000915 A1 | 1/2016 |
| WO | WO 2016/048074 A1 | 3/2016 |

OTHER PUBLICATIONS

CATT, "Further discussion on RS for phase tracking for DL", 3GPP TSG RAN WG1 Meeting #88bis, R1-1704564, Spokane, USA, Apr. 3-7, 2017, 2 pages.
(Continued)

*Primary Examiner* — Elton Williams
(74) *Attorney, Agent, or Firm* — Birch, Stewart, Kolasch & Birch, LLP

(57) ABSTRACT

The present invention discloses a method of receiving a phase tracking reference signal by a user equipment in a wireless communication system and device for supporting the same.

7 Claims, 19 Drawing Sheets

(56) References Cited

U.S. PATENT DOCUMENTS

| | | |
|---|---|---|
| 2013/0114535 A1 | 5/2013 | Ng et al. |
| 2015/0092583 A1 | 4/2015 | Balraj et al. |
| 2016/0006594 A1 | 1/2016 | Persson et al. |
| 2018/0041321 A1 | 2/2018 | Guo et al. |
| 2018/0091350 A1 | 3/2018 | Akkarakaran et al. |
| 2018/0227929 A1 | 8/2018 | Yoo et al. |

OTHER PUBLICATIONS

CATT, "Further Discussion on RS Phase Tracking for DL," 3GPP TSG RAN WG1 Meeting #88bis, R1-1704564, Spokane, USA, Apr. 3-7, 2017, 2 pages.

Ericsson, "On DL PTRS Design," 3GPP TSG-RAN WG1 #88bis, R1-1705906, Spokane, WA, USA, Apr. 3-7, 2017, pp. 1-11.

Ericsson, "Summary of PTRS Issues and way forwards," 3GPP TSG-RAN WG1 Meeting #88bis, R1-1706598, Spokane, U.S., Apr. 3-7, 2017, pp. 1-4.

Ericsson, "Summary of PTRS open issues and companies views," 3GPP TSG-RAN WG1 Meeting #89, R1-1707803, Hangzhou, China, May 15-19, 2017, pp. 1-6.

Huawei et al., "Further details for PT-RS design," 3GPP TSG RAN WG1 Meeting #88b, R1-1704240, Spokane, USA, Apr. 3-7, 2017, 5 pages.

Intel Corporation, "Study of Phase Noise Tracking," 3GPP TSG-RAN WG1 #86, R1-167888, Gothenburg, Sweden, Aug. 22-26, 2016, pp. 1-9.

LG Electronics, "On DL PT-RS design", 3GPP TSG RAN WG1 Meeting #88bis, R1-1704890, Spokane, USA, Apr. 3-7, 2017, pp. 1-3.

National Instruments, "Discussion on explicit and implicit signaling for PT-RS," 3GPP TSG RAN WG1 Meeting #89, R1-1708272, Hangzhou, P.R. of China, May 15-19, 2017, pp. 1-11.

National Instruments, "Discussion on Signaling for PT-RS", R1-1705253, 3GPP TSG RAN WG1 Meeting #88bis, Spokane, USA, Apr. 3-7, 2017, pp. 1-10.

Panasonic, "PT-RS Port Association and Indication," 3GPP TSG RAN WG1 Meeting #88bis, R1-1705160, Spokane, USA, Apr. 3-7, 2017, 5 pages.

Samsung, "DL PT-RS design," 3GPP TSG RAN WG1 #88bis, R1-1705355, Spokane, USA, Apr. 3-7, 2017, 7 pages.

ZTE et al., "Discussion on RS for phase tracking", 3GPP TSG RAN WG1 Meeting #88bis, R1-1704413, Spokane, USA, Apr. 3-7, 2017, 5 pages.

* cited by examiner (a)

| | | #3 | #5 | #6 | #7 | #8 | #9 | #10 | #11 | #12 | #13 |
|---|---|---|---|---|---|---|---|---|---|---|---|
| Frequency | | P1/P3 | | | | | | | | | |
| | | P0/P2 | | | | | | | | | |
| | | P1/P3 | | | | | | | | | |
| | | P0/P2 | | | | | | | | | |
| | | P1/P3 | | | | | | | | | |
| | | P0/P2 | | | | | | | | | |
| | | P1/P3 | | | | | | | | | |
| | | P0/P2 | | | | | | | | | |
| | | P1/P3 | | | | | | | | | |
| | | P0/P2 | | | | | | | | | |
| | | P1/P3 | | | | | | | | | |
| | | P0/P2 | PT-RS port #0 & #2 | | | | | | | | | |

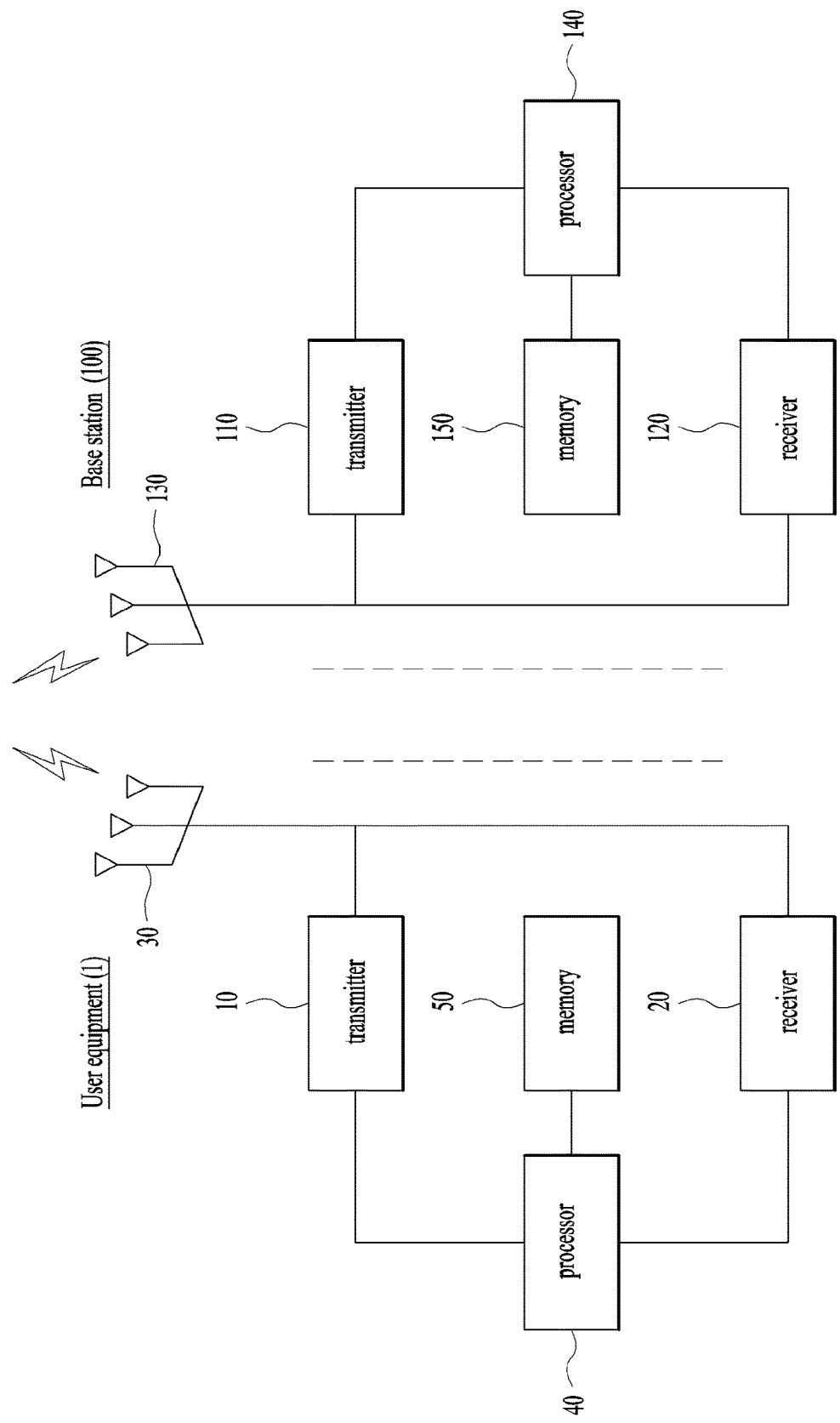

METHOD OF RECEIVING PHASE TRACKING REFERENCE SIGNAL BY USER EQUIPMENT IN WIRELESS COMMUNICATION SYSTEM AND DEVICE FOR SUPPORTING SAME

CROSS REFERENCE TO RELATED APPLICATIONS

This application is a Continuation of U.S. application Ser. No. 16/065,055, filed on Jun. 21, 2018 (now U.S. Pat. No. 10,951,374 issued on Mar. 16, 2021), which is the National Phase of PCT International Application No. PCT/KR2018/004717, filed on Apr. 24, 2018, which claims priority under 35 U.S.C. 119(e) to U.S. Provisional Application Nos. 62/489,431, filed on Apr. 24, 2017 and 62/542,340, filed on Aug. 8, 2017, all of which are hereby expressly incorporated by reference into the present application.

TECHNICAL FIELD

The present invention relates to a wireless communication system, and more particularly, to a method of receiving a phase tracking reference signal by a user equipment in a wireless communication system and device for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE OF THE INVENTION

Technical Task

The object of the present invention is to provide a method of receiving a phase tracking reference signal by a user equipment in a wireless communication system and devices for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present invention provides a method of receiving a phase tracking reference signal (PT-RS) by a user equipment in a wireless communication system and devices for supporting the same.

In an aspect of the present invention, provided herein is a method of receiving a phase tracking reference signal (PT-RS) by a user equipment (UE) in a wireless communication system, including: determining the highest time density by comparing time densities respectively corresponding to a plurality of PT-RS ports allocated to the UE; and receiving PT-RSs corresponding to the plurality of PT-RS ports, which are transmitted based on the determined highest time density, via the plurality of PT-RS ports, respectively.

In another aspect of the present invention, provided herein is a user equipment (UE) for receiving a phase tracking reference signal (PT-RS) in a wireless communication system: a receiver; and a processor connected to the receiver, wherein the processor may be configured to: determine the highest time density by comparing time densities respectively corresponding to a plurality of PT-RS ports allocated to the UE; and receive PT-RSs corresponding to the plurality of PT-RS ports, which are transmitted based on the determined highest time density, via the plurality of PT-RS ports, respectively.

In this configuration, each of the time densities of the plurality of PT-RS ports may have one of the following values: one PT-RS symbol per symbol, one PT-RS symbol every two symbols, or one PT-RS symbol every four symbols.

In addition, the time densities respectively corresponding to the plurality of PT-RS ports may be determined based on modulation and coding schemes (MCSs) for the individual PT-RS ports.

In this case, the determined highest time density may correspond to the highest MCS among the MCSs for the plurality of PT-RS ports.

Moreover, the plurality of PT-RS ports are two PT-RS ports, and wherein the two PT-RS ports may be equivalent to different demodulation reference signal (DM-RS) port groups.

In this case, the different DM-RS port groups may be equivalent to different transmission reception points (TRPs).

Further, the UE may receive downlink control information (DCI) including information on MCSs for the different DM-RS port groups.

Additionally, in this configuration, each of the frequency densities of the PT-RSs corresponding to the plurality of PT-RS ports may be determined based on bandwidth scheduled for a corresponding PT-RS port and power boosting level for the corresponding PT-RS port, and PT-RSs corresponding to PT-RS ports having other time densities rather than the highest time density may be received by applying 0 dB (decibel) power boosting, 3 dB power boosting, or 6 dB power boosting thereto based on signaling.

In this case, if bandwidth scheduled for a first PT-RS port among the plurality of PT-RS ports is equal to that scheduled for a second PT-RS port among the plurality of PT-RS ports, and if power boosting level for the first PT-RS port is different from that for the second PT-RS port, PT-RSs corresponding to the first and second PT-RS ports may have different frequency densities.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, when a UE receive PT-RSs via different DM-RS port groups (or TRPs) in a wireless communication system to which the present invention is applicable, the UE can apply power boosting to all PT-RS ports, thereby reducing PT-RS overhead.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 15 is a diagram schematically illustrating a case where DM-RS port groups #0 and #1 correspond to PT-RS ports #0 and #2, respectively (or a case where PT-RS ports #0 and #2 are used);

FIG. 18 is a diagram schematically illustrating an example where PT-RSs are transmitted through PT-RS ports #0 and #1 with different time densities;

FIG. 19 is a diagram schematically illustrating another example where PT-RSs are transmitted through PT-RS ports #0 and #1 with different time densities;

FIG. 21 is a diagram illustrating configurations of a user equipment and a base station for implementing the proposed embodiments.

BEST MODE FOR INVENTION

Figure 1:
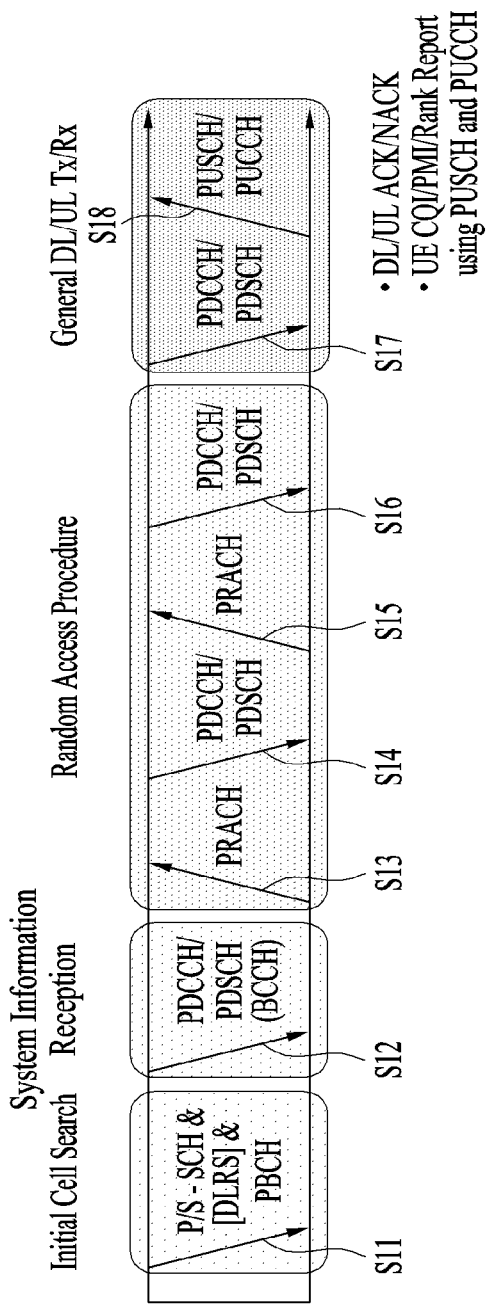
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the tent terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1.3GPP LTE/LTE-A System 1.1. Physical Channels and Signal Transmission and Reception 1 Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCI) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
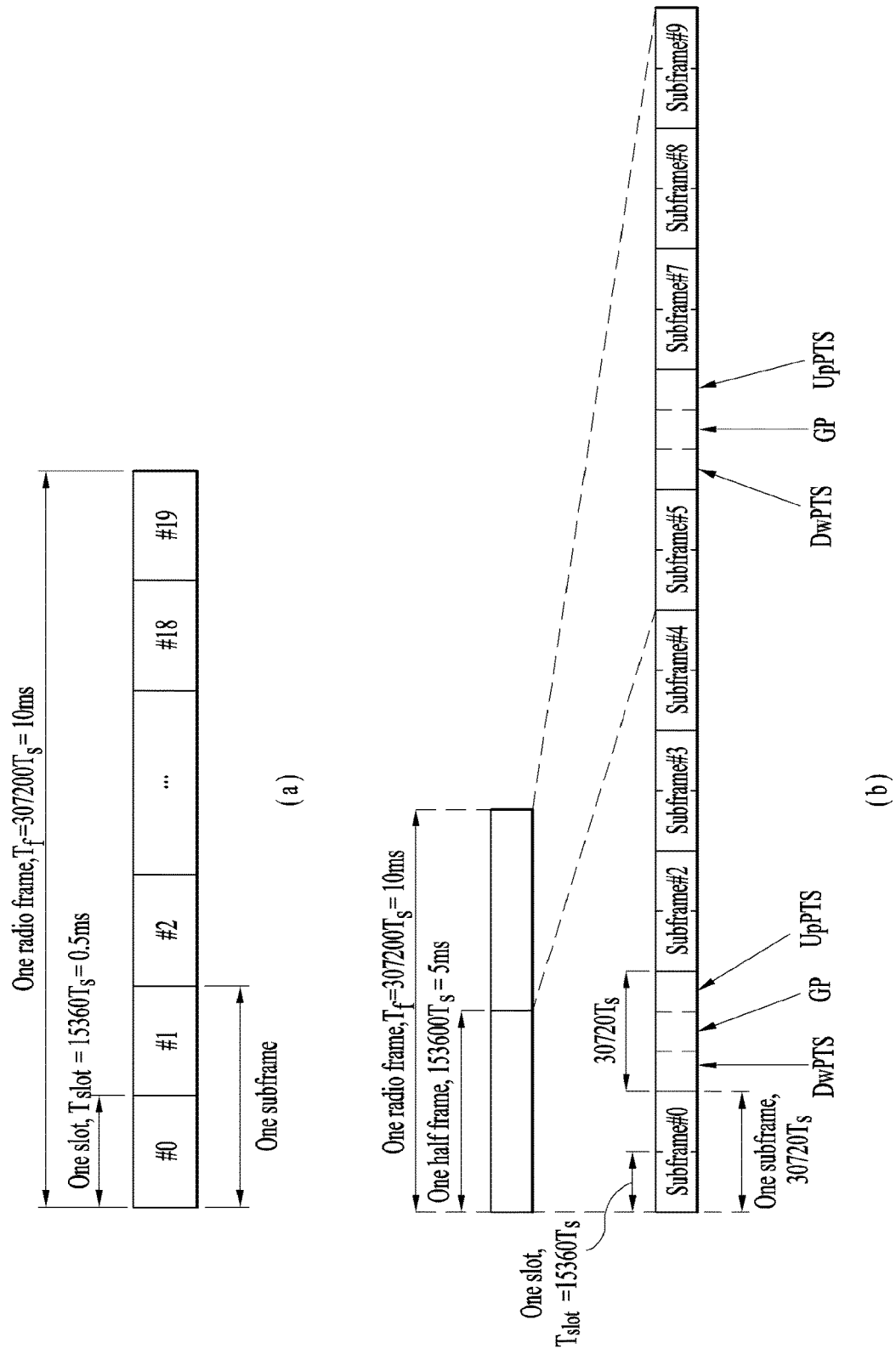
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360.·Ts) long. One subframe includes two successive slots. An ith subframe includes 2ith and (2i1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UI, transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations DwPTS/GP/UpPTS lengths).

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560\, T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
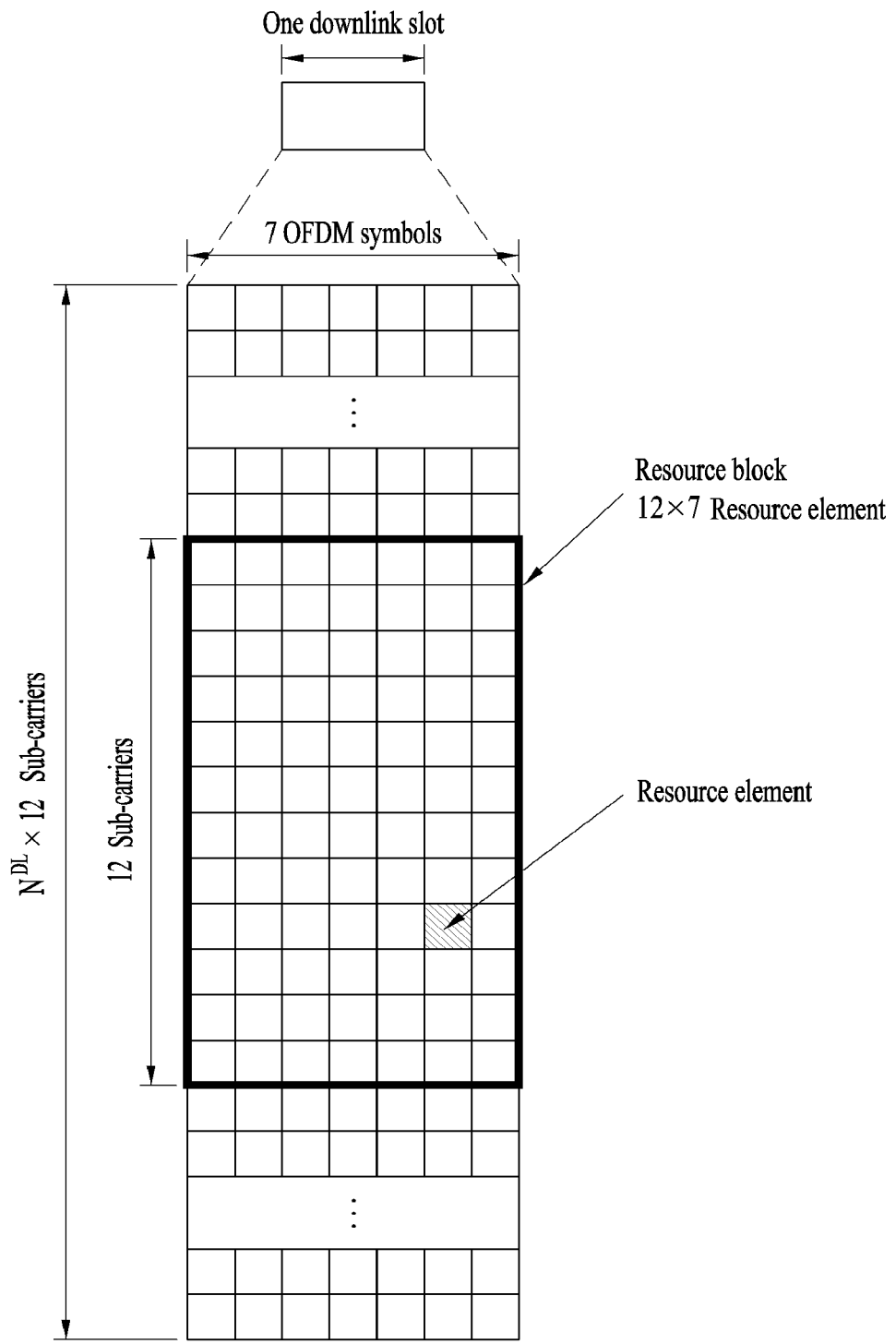
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
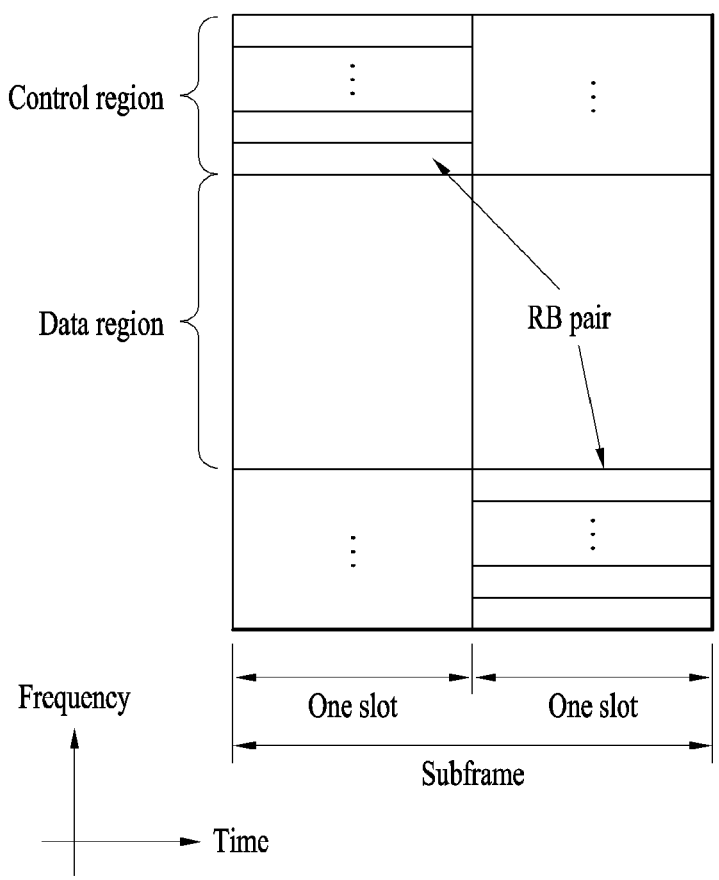
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
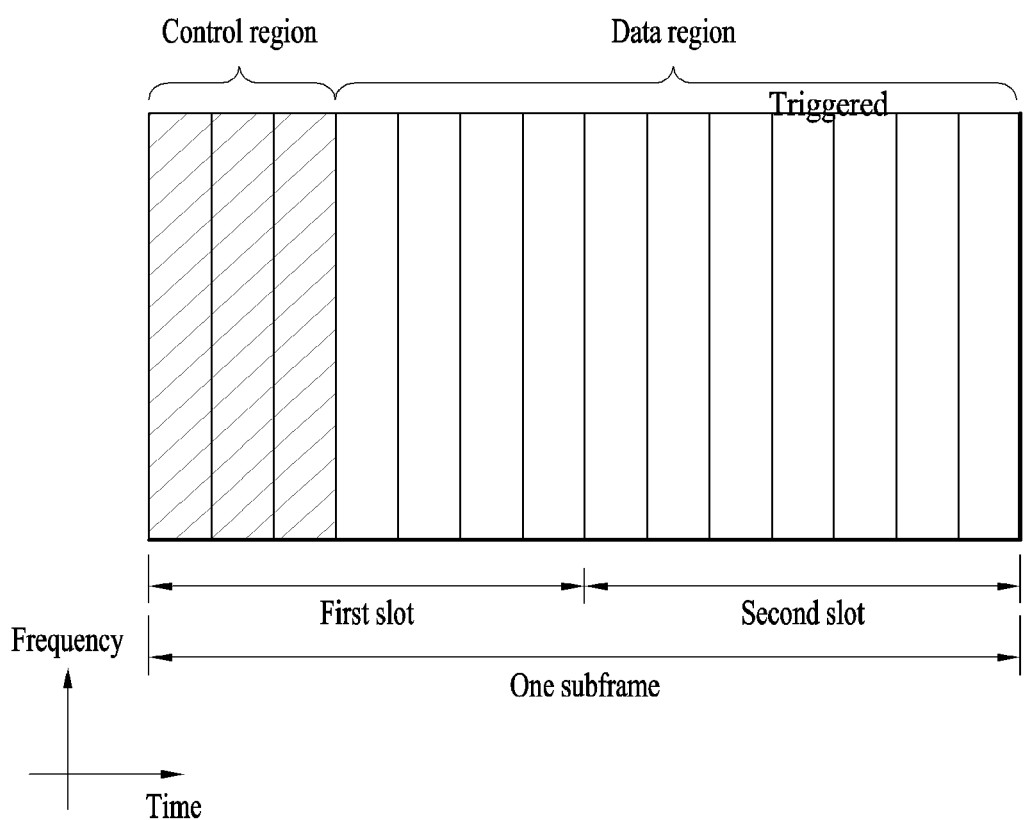
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

2.1. Numerologies

The NR system to which the present invention is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 3

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframe, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in$ $\{0, \ldots, N_{slot}^{subframe, \mu}-1\}$ and may also be numbered within a frame in ascending order like $n_{s,f}^{\mu} \in \{0, \ldots, N_{slot}^{frame, \mu}-1\}$. In this case, the number of consecutive OFDM symbols in one slot ($N_{symb}^{slot}$) may be determined as shown in the following table according to the cyclic prefix. The start slot ($n_s^{\mu}$) of one subframe is aligned with the start OFDM symbol ($n_s^{\mu} N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame, \mu}$ | $N_{slot}^{subframe, \mu}$ |
|---|---|---|---|
| 2 | 12 | 40 | 4 |

In the NR system to which the present invention can be applied, a self-contained slot structure can be applied based on the above-described slot structure.

Figure 6:
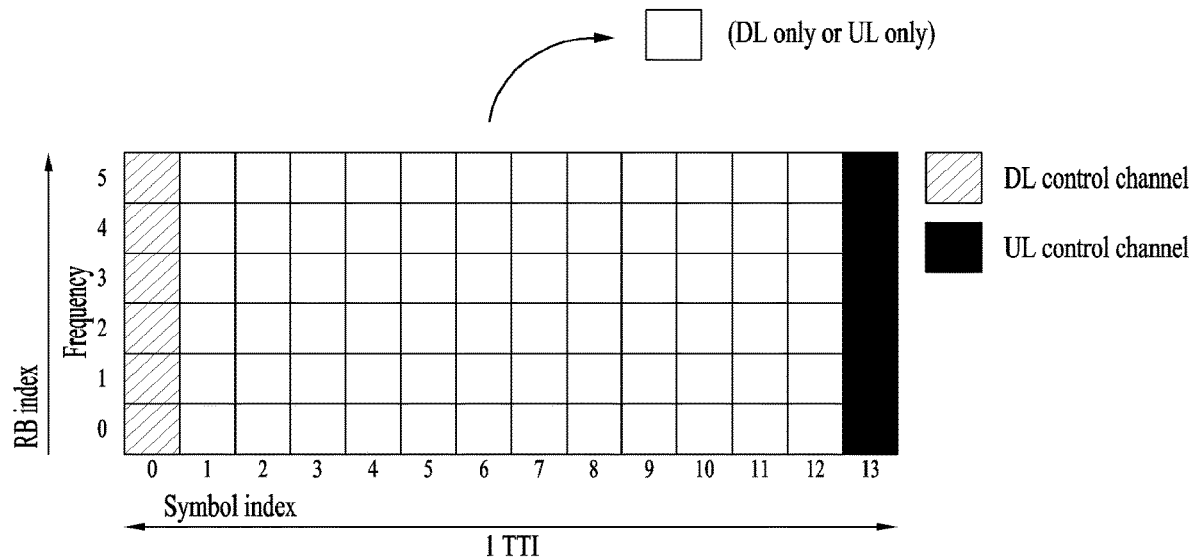
FIG. 6 is a diagram illustrating a self-contained subframe structure applicable to the present invention.

FIG. 6 is a diagram illustrating a self-contained slot structure applicable to the present invention.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slat structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3, Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
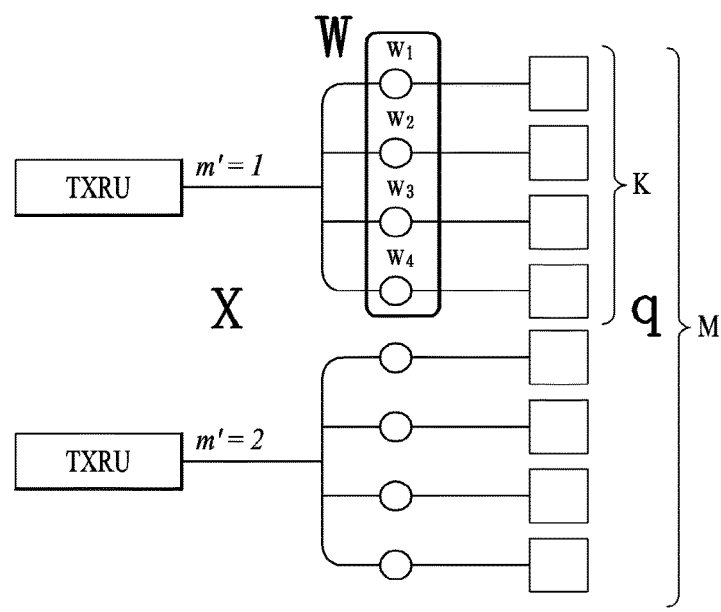
FIGS. 7 and 8 are diagrams illustrating representative connection methods for connecting TXRUs to antenna elements.
Figure 8:
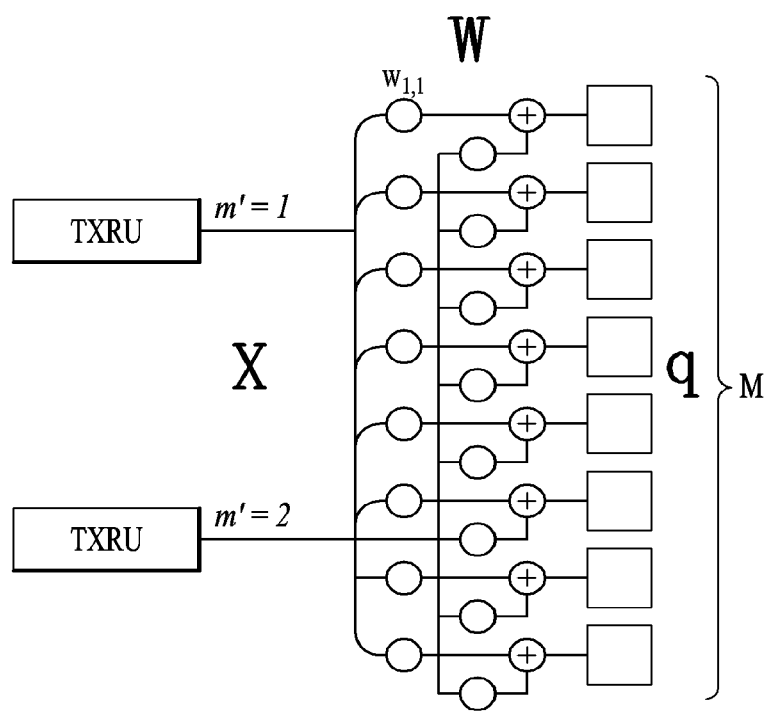

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
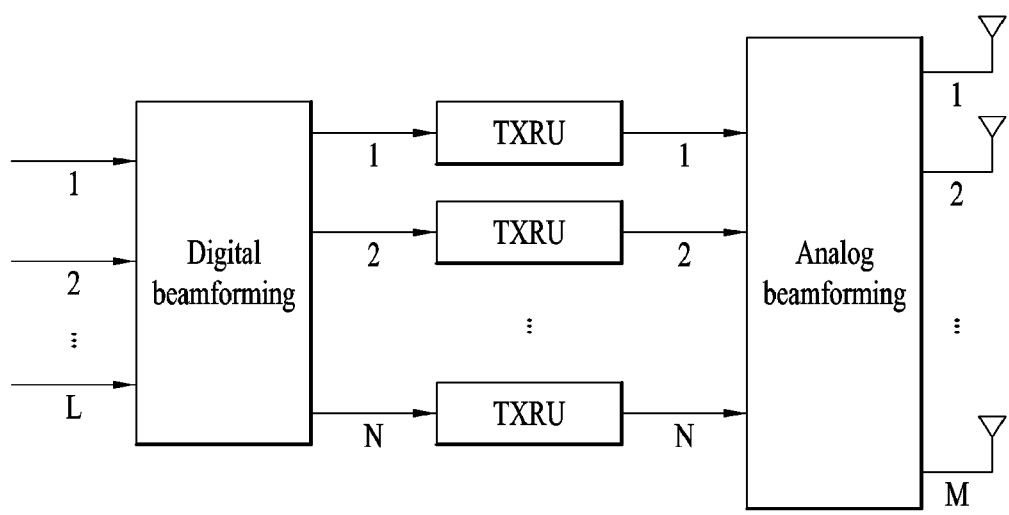
FIG. 9 is a schematic diagram illustrating a hybrid beamforming structure according to an embodiment of the present invention from the perspective of TXRUs and physical antennas.

FIG. 9 is a schematic diagram illustrating a hybrid beamforming structure according to an embodiment of the present invention from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present invention is applicable.

Figure 10:
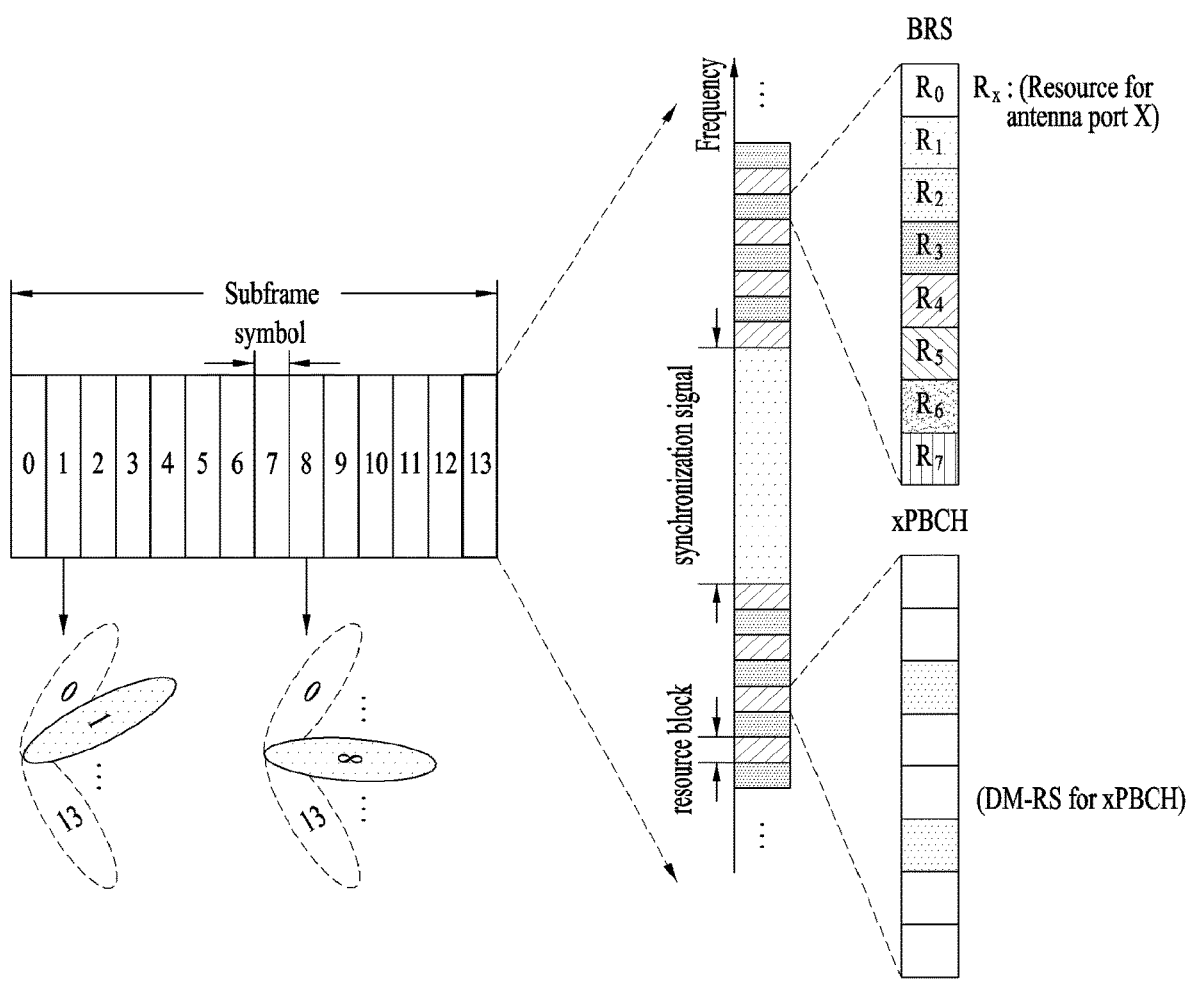
FIG. 10 is a diagram schematically illustrating the beam sweeping operation for synchronization signals and system information during a downlink (DL) transmission process according to an embodiment of the present invention.

FIG. 10 is a diagram schematically illustrating the beam sweeping operation for synchronization signals and system information during a downlink (DL) transmission process according to an embodiment of the present invention In FIG. 10, a physical resource (or channel) for transmitting system information of the NR system to which the present invention is applicable in a broadcasting manner is referred to as a physical broadcast channel (xPBCH). In this case, analog beams belonging to different antenna panels can be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS can be defined for a plurality of antenna ports, and each BRS antenna port may correspond to a single analog beam. In this case, unlike the BRS, all analog beams in the analog beam group can be applied. to the synchronization signal or xPBCH unlike the BRS to assist a random UE to correctly receive the synchronization signal or xPBCH.

2.4 PT-RS (Phase Tracking Reference Signal)

Hereinafter, phase noise will be described. Jitter, which occurs in the time domain, may appear as phase noise in the frequency domain. Such phase noise randomly changes the phase of the received signal in the time domain as shown in the following equation.

$$r_n = s_n e^{j\phi_n} \quad \text{[Equation 1]}$$

$$\text{where } s_n = \sum_{k=0}^{N-1} d_k e^{j2\pi \frac{kn}{N}}$$

In Equation 1, the parameters $r_n$, $s_n$, $d_k$, $\phi_n$ indicate a received signal, a time-domain signal, a frequency-domain signal, and a phase rotation value due to phase noise, respectively. When the DFT (discrete Fourier transform) process is applied the received signal in Equation 11, Equation 2 is obtained.

$$y_k = d_k \frac{1}{N} \sum_{n=0}^{N-1} e^{j\phi_n} + \frac{1}{N} \sum_{\substack{t=0 \\ t \neq k}}^{N-1} d_t \sum_{n=0}^{N-1} e^{j\phi_n} e^{j2\pi(t-k)m/N} \quad \text{[Equation 2]}$$

In Equation 2, the parameters $$\frac{1}{N} \sum_{n=0}^{N-1} e^{j\phi_n}, \frac{1}{N} \sum_{\substack{t=0 \\ t \neq k}}^{N-1} d_t \sum_{n=0}^{N-1} e^{j\phi_n} e^{j2\pi(t-k)m/N}$$

indicate common phase error (CPE) and inter-cell interference (ICI), respectively. In this case, as phase noise correlation increases, the value of the CPE in Equation 12 increases. Such CPE can be considered as a kind of carrier frequency offset in a WLAN system, but from the perspective of the UE, the CPE and CFO could be interpreted as to be similar to each other.

By performing CPE/CFO estimation, the UE can eliminate CPE/CFO corresponding to phase noise in the frequency domain. In addition, to correctly decode a received signal, the UE should perform the CPE/CFO estimation before decoding the received signal. Accordingly, the eNB can transmit a certain signal to the UE in order for the UE to perform the CPE/CFO estimation accurately. That is, the main purpose of such a signal is to estimate phase noise. To this end, a pilot signal previously shared between the eNB and UE may be used, or a data signal may be changed or duplicated. In this specification, a series of signals for estimating phase noise are commonly called the phase compensation reference signal (PCRS), phase noise reference signal (PNRS), or phase tracking reference signal (PT-RS). Hereinafter, for convenience of description, all of them are referred to as the PT-RS.

2.4.1. Time-Domain Pattern (or time density)

Figure 11:
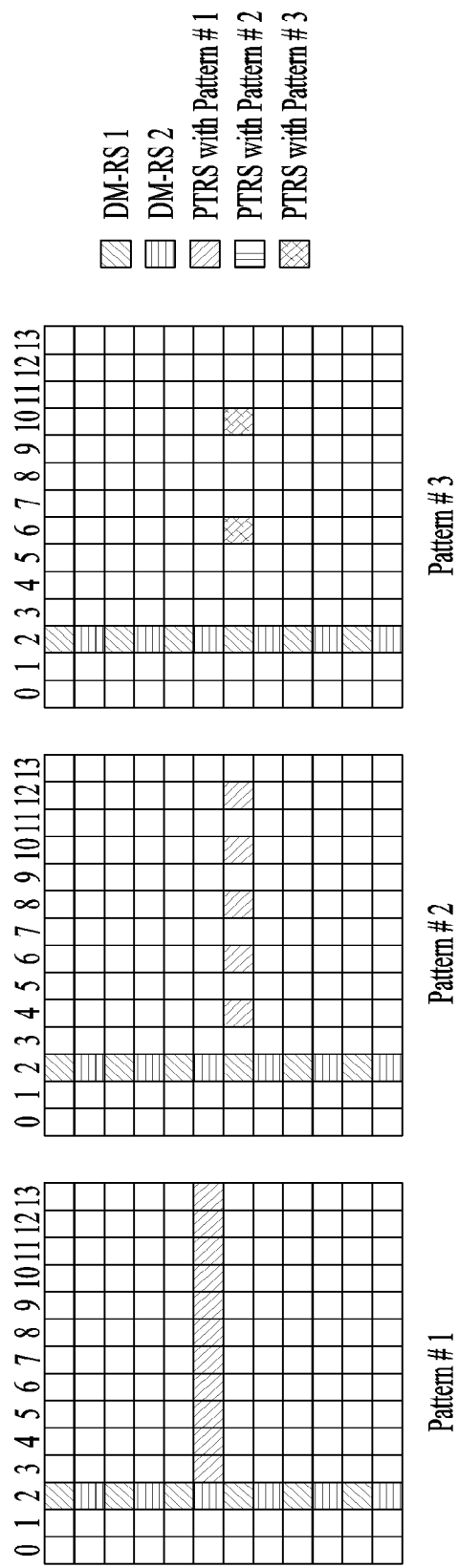
FIG. 11 is a diagram illustrating PT-RS time-domain patterns applicable to the present invention.

FIG. 11 is a diagram illustrating PT-RS time-domain patterns applicable to the present invention.

As shown in FIG. 11, the PT-RS may have different patterns depending on the applied modulation and coding scheme (MCS) level.

TABLE 6

| MCS level | PT-RS time pattern |
|---|---|
| (64QAM, CR = 1/3) <= MCS < (64QAM, CR = 1/2) | #3 |
| (64QAM, CR = 1/2) <= MCS < (64QAM, CR =5/6) | #2 |
| (64QAM, CR = 5/6) <= MCS | #1 |

As shown in FIG. 11 and Table 6, the PT-RS mapping pattern may differ according to the applied MCS level.

If this configuration is generalized, the PT-RS time-domain pattern (or time density) can be defined as shown in the following table.

TABLE 7

| Scheduled MCS | Time density ($L_{PT-RS}$) |
| --- | --- |
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

In this case, the time densities of 1, 2, and 4 may correspond to patterns #1, #2. and #3 of FIG. 11, respectively.

In this configuration, ptrs-MCS1, ptrs-MCS2, ptrs-MCS3, and ptrs-MCS4 may be defined through higher layer signaling.

2.4.2 Frequency-Domain Pattern (or frequency density)

According to the present invention, the PT-RS can be mapped to one subcarrier every one resource block (RB), one subcarrier every two RBs, or one subcarrier every four RBs for transmission thereof. In this case, the frequency-domain pattern (or frequency density) of the PT-RS may be configured according to scheduled bandwidth.

For example, the frequency density can be determined as shown in Table 8 according to the scheduled bandwidth.

TABLE 8

| Scheduled BW | Frequency density |
| --- | --- |
| 0 < $N_{RB}$ <= 4 | No PT-RS |
| 5 < $N_{RB}$ <= 8 | 1 |
| 9 < $N_{RB}$ <= 16 | 1/2 |
| 17 < $N_{RB}$ <= 32 | 1/4 |

In this case, the frequency density of 1 may correspond to a frequency-domain pattern where the PT-RS is mapped to one subcarrier every RB, the frequency density of 1/2 may correspond to a frequency-domain pattern where the PT-RS is mapped to one subcarrier every four RBs, and the frequency density of 1/4 may correspond to a frequency-domain pattern where the PT-RS is mapped to one subcarrier every four RBs.

If this configuration is generalized, the frequency-domain pattern or frequency density) of the PT-RS can be defined as shown in the following table.

TABLE 9

| Scheduled bandwidth | Frequency density ($K_{PT-RS}$) |
| --- | --- |
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

In this case, the frequency density of 2 may correspond to the frequency-domain pattern where the PT-RS is mapped to one subcarrier every two RBs, and the frequency density of 4 may correspond to the frequency-domain pattern where the PT-RS is mapped to one subcarrier every four RBs.

In this configuration, $N_{RB0}$ and $N_{RB1}$ an be defined through higher layer signaling.

2.4.3. DM-RS Port Configuration

Figure 12:
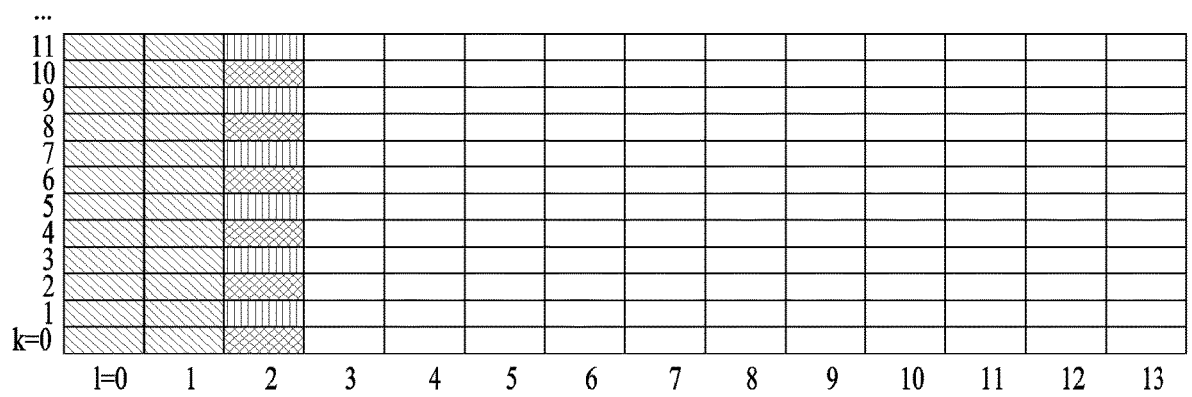
FIG. 12 is a diagram schematically illustrating an example of configuring DM-RS ports applicable to the present invention.
Figure 12:
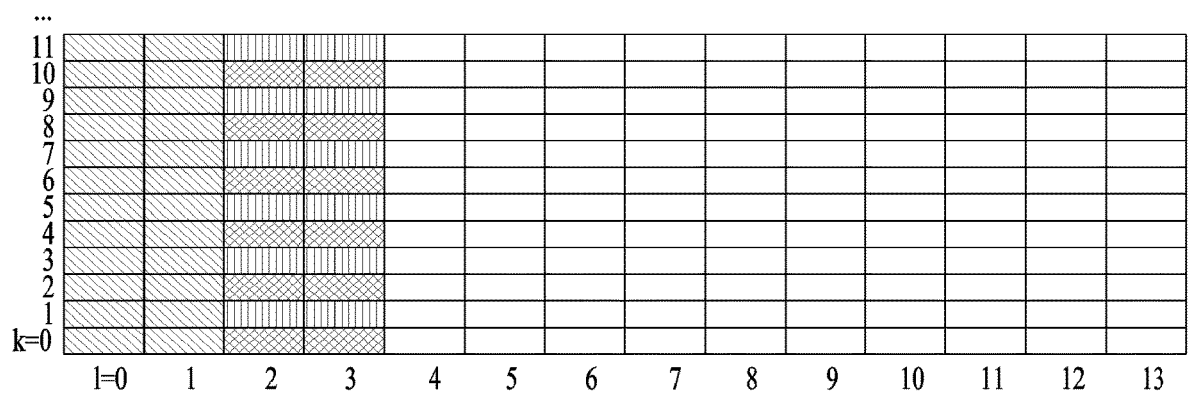

FIG. 12 is a diagram schematically illustrating an example of configuring DM-RS ports applicable to the present invention.

Specifically, FIG. 12(a) shows a structure where the DM-RS is front loaded with one symbol (front loaded DM-RS with one symbol), and FIG. 12(b) shows a structure where the DM-RS is front loaded with two symbols (front loaded DM-RS with two symbols).

In FIG. 12, Δ is the DM-RS offset value in the frequency domain. In this case, DM-RS ports with the same Δ can be code division multiplexed in the frequency domain (CDM-F) or code division multiplexed in the time domain (CDM-T). In addition, CDM-F can also be applied to DM-RS ports with different Δ.

In FIG. 12, the FDM or CDM-F can be applied to port #1000 to #1003. In addition, ports #1004 to #1007 can be code division multiplexed with ports #1000 to #1003 in the time domain.

Based on the DM-RS port configuration shown in FIG. 12, the eNB can provide the DM-RS port configuration through downlink control information defined as shown in the following table.

In the following table, P0 to P7 may correspond to ports #1000 to #1007, respectively, and each of values 4, 5, 7, and 9 may indicate that DM-RS ports are code division multiplexed in the time domain (CDM-T).

TABLE 10

| value | message | |
| --- | --- | --- |
| # | # of layers | antenna port(s) |
| 0 | 1 layer | P0 |
| 1 | 1 layer | P1 |
| 2 | 1 layer | P2 |
| 3 | 1 layer | P3 |
| 4 | 2 layer | P0/P1 |
| 5 | 2 layer | P2/P3 |
| 4 | 2 layer | P0/P4 |
| 5 | 2 layer | P1/P5 |
| 6 | 3 layer | P0/P1/P2 |
| 7 | 3 layer | P0/P1/P4 |
| 8 | 4 layer | P0/P1/P2/P3 |
| 9 | 4 layer | P0/P1/P2/P4 |

3. Proposed Embodiment

Hereinafter, the embodiments of the present invention will be described in detail based on the above-described technical features.

In the following, it is assumed that the eNB (or TRP (transmission reception point) is a transmitter transmitting the PT-RS and the UE is a receiver. However, this is merely for convenience of description, and in some embodiments, the UE may be a transmitter and the eNB (or TRP) may be a receiver.

3.1 First Proposal

According to the present invention, when performing signal retransmission, the transmitter can transmit a PT-RS according to pattern #1 of FIG. 11 regardless of the MCS and/or PRB size. In addition, the receiver can assume that the PT-RS, which is contained in the retransmitted signal, is transmitted based on pattern #1 of FIG. 11 and then receive the PT-RS.

In the case of the retransmission, the reception success rate needs to be considered rather than the spectral efficiency. Thus, the PT-RS with the densest time and/or frequency pattern (or the highest density) may be transmitted regardless of MCS and/or PRB size.

For example, when the transmitter dose not transmit any PT-RS during the initial transmission due to small PRB size, if retransmission is required, the transmitter may transmit a PT-RS according to pattern #1 (or pattern #2) of FIG. 11. As described above, the purpose of the signal retransmission is to improve the decoding performance of the receiver by increasing throughput. Therefore, the transmitter can transmit the PT-RS with the highest time/frequency density in order to improve the channel estimation performance.

As a particular example, in the case of MCS <=64QAM, 5/6 code rate, and PRB size <=4, the transmitter transmits no PT-RS to obtain better spectral efficiency. However, in the case of the retransmission, the transmitter transmits the PT-RS according to pattern #1 (or pattern #2) of FIG. 11. In addition, to guarantee the performance of command phase error (CPE) estimation, the transmitter may perform PT-RS transmission on four PRBs.

As another example, when the transmitter transmits the PT-RS based on the time density of 1/2 (pattern #2 of FIG. 11) or time density of 1/4 (pattern #3 of FIG. 11) during the initial transmission, if retransmission is required, the transmitter may transmit the PT-RS based on pattern #1 of FIG. 11 during the retransmission.

As a particular example, in the case of MCS <=64QAM, 5/6 code rate, and PRB size <32, PT-RS pattern #2 of FIG. 11 may have the highest spectral efficiency. However, in the case of the retransmission, the transmitter may transmit the PT-RS according to pattern #1 rather than pattern #2. In this case, if the PRB size is 16, the transmitter may perform the PT-RS transmission on either 8 or 16 PRBs rather than 4 PRBs among 16 PRBs by increasing the PT-RS frequency density. By doing so, the number of PT-RS samples increases, and thus it is more robust to interference or noise.

Additionally, a PT-RS port for the PT-RS retransmission can be associated with a DM-RS port except the DM-RS port used for the previous PT-RS transmission. In other words, the PT-RS port for the retransmission may correspond to any DM-RS port except the DM-RS port used for the previous transmission.

In this case, association between a specific DM-RS port and a specific PT-RS port may mean that the same precoding is applied to the two ports. Alternatively, association between one or more DM-RS ports (e.g., DM-RS port group) and a specific PT-RS port may mean that the one or more DM-RS ports (e.g., DM-RS port group) share common phase error based on a PT-RS transmitted at the PT-RS port.

3.2 Second Proposal

Before describing the configuration according to the present invention, details of the DM-RS port group applicable to the present invention will be described hereinafter.

First, a downlink DM-RS port group may mean a group of DM-RS ports which are quasi-co-located (QCL) or partially QCL.

In this case, DM-RS port groups may be QCL with different channel state information reference signals (CSI-RSs), respectively.

According to the present invention, a plurality of DM-RS port groups can be defined for one TRP. However, for convenience of description, it is assumed one DM-RS port group is defined for one TRP.

Figure 13:
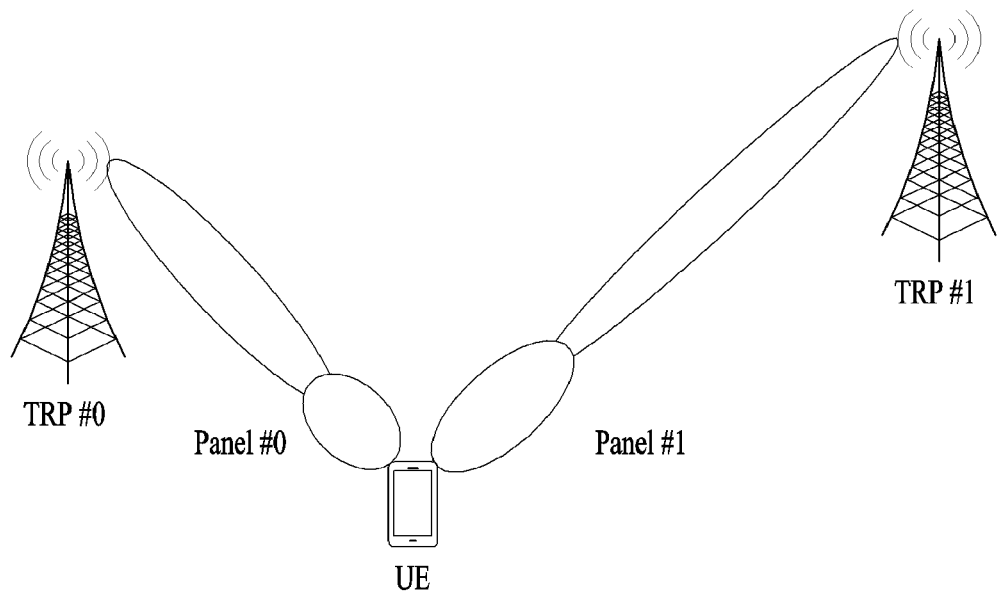
FIG. 13 is a diagram schematically illustrating a case where a single UE is connected to different TRPs and receives signals therefrom.

FIG. 13 is a diagram schematically illustrating a case where a single UE is connected to different TRPs and receives signals therefrom. In FIG. 13, the UE may have two panels and a beam corresponding to each of the panels may be connected to each TRP as shown in FIG. 13. In this case, if one DM-RS port group is defined for each beam, two DM-RS port groups can be assumed in FIG. 13.

(1) COMP (Coordinated Multi-Point Transmission/Reception) Type A

In this case, it is assumed that the non-coherent join transmission (JT) is applied, and DCI can be defined for each DM-RS port group. Accordingly, DM-RS port groups can transmit different codewords (CWs) to the UE.

In addition, one DM-RS port group may transmit one or two CWs. Particularly, if the number of layers is equal to or less than 4, the number of CWs may be set to 1. On the other hand, if the number of layers is more than 5, the number of CWs may be set to 2.

At this time, different DM-RS port groups may have different scheduled bandwidth.

(2) CoMP Type B

In this case, a single piece of DCI can be defined for a plurality of DM-RS port groups. At this time, the DM-RS port groups may transmit one or two CWs to the UE.

In FIG. 13, the two DM-RS port groups transmit one or two CWs. In this case, if the total number of layers transmitted from the two DM-RS port groups is equal to or less than 4, the number of CWs may be set to 1. If the total number of layers is more than 5, the number of CWs may be set to 2.

Similarly, an uplink DM-RS port group may mean a group of DM-RS ports which are quasi-co-located (QCL) or partially QCL.

Figure 14:
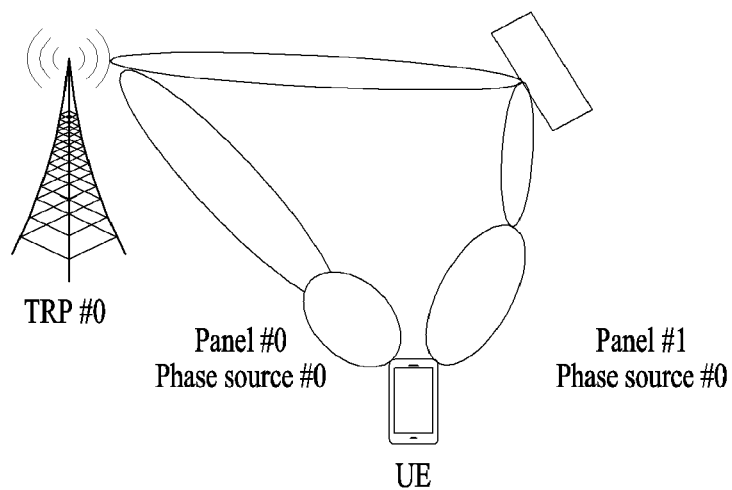
FIG. 14 is a diagram schematically illustrating a case where a UE is connected to one TRP using two beams through different panels.

FIG. 14 is a diagram schematically illustrating a case where a UE is connected to one TRP using two beams through different panels. In FIG. 14, it is assumed that each beam corresponds to a DM-RS port group, that is, a total of two DM-RS port groups are configured. However, a plurality of panels of the UE may be set to one DM-RS port group.

1) UL Multi DCI

When DCI is defined for DM-RS port group, each DM-RS port group may transmit a different CW.

In this case, one DM-RS port group may transmit one or two CWs. Particularly, if the number of layers is equal to or less than 4, the number of CWs may be set to 1. On the other hand, if the number of layers is more than 5, the number of CWs may be set to 2.

At this time, different DM-RS port groups may have different scheduled bandwidth.

2) UL Single DCI

In this case, single DCI can be defined for all DM-RS port groups participating in UL transmission. At this time, all DM-RS port groups may transmit one or two CWs to the UE.

In FIG. 14, the two DM-RS port groups transmit one or two CWs. In this case, if the total number of layers transmitted from the two DM-RS port groups is equal to or less than 4, the number of CWs may be set to 1. If the total number of layers is more than 5, the number of CWs may be set to 2.

Hereinafter, the configuration proposed in the present invention will be described in detail based on the DM-RS port group configuration.

According to the second proposal of the present invention, when the transmitter transmits PT-RSs on the same frequency and time resources via different DM-RS port groups, each PT-RS time pattern may be the densest PT-RS time pattern.

For example, in the case of CoMP type B (or UL single DCI) and 1 CW, different DM-RS port groups may have the same BW (bandwidth) and MCS. On the other hand, in the case of CoMP type B (or UI single DCI) and 2 CWs, different DM-RS port groups may have different MCSs. Thus, PT-RSs corresponding to the different DM-RS port groups may have different time patterns.

According to the configuration proposed in the present invention, when the transmitter transmits PT-RSs on the same frequency and time resources via different DM-RS port groups, even if PT-RS ports have different time densities, the transmitter may transmit the PT-RSs corresponding to the different DM-RS port groups according to the densest time pattern thereamong.

FIG. 15 is a diagram schematically illustrating a case where DM-RS port groups #0 and #1 correspond to PT-RS ports #0 and #2, respectively (or a case where PT-RS ports #0 and #2 are used).

In FIG. 15, PT-RS ports #0 and #2 may be configured to transmit PT-RSs using time pattern #1 and time pattern #2, respectively. However, PT-RS port #2 may transmit a PT-RS using time pattern #1 rather than time pattern #2.

Accordingly, the performance of CPE estimation can be improved due to increase in the spatial diversity.

Meanwhile, although PT-RS port #2 transmits the PT-RS using time pattern #2 instead of time pattern #1, since PT-RS port #0 transmits the PT-RS using pattern #1, there is no RS overhead gain.

In FIG. 15, it could be interpreted to mean that PT-RS port #0 is associated with DM-RS ports #0 and #2.

3.3. Third Proposal

According to the third proposal of the present invention, the eNB can transmit to the UE information on whether PT-RS power boosting will be applied and/or information on boosting level (e.g., 0/3/6 dB) via higher layer signaling (e.g., RRC (radio resource control) or MAC-CE (medium access control—control element)). In addition, the UE can determine the number of PT-RS subcarriers based on the information.

Figure 16:
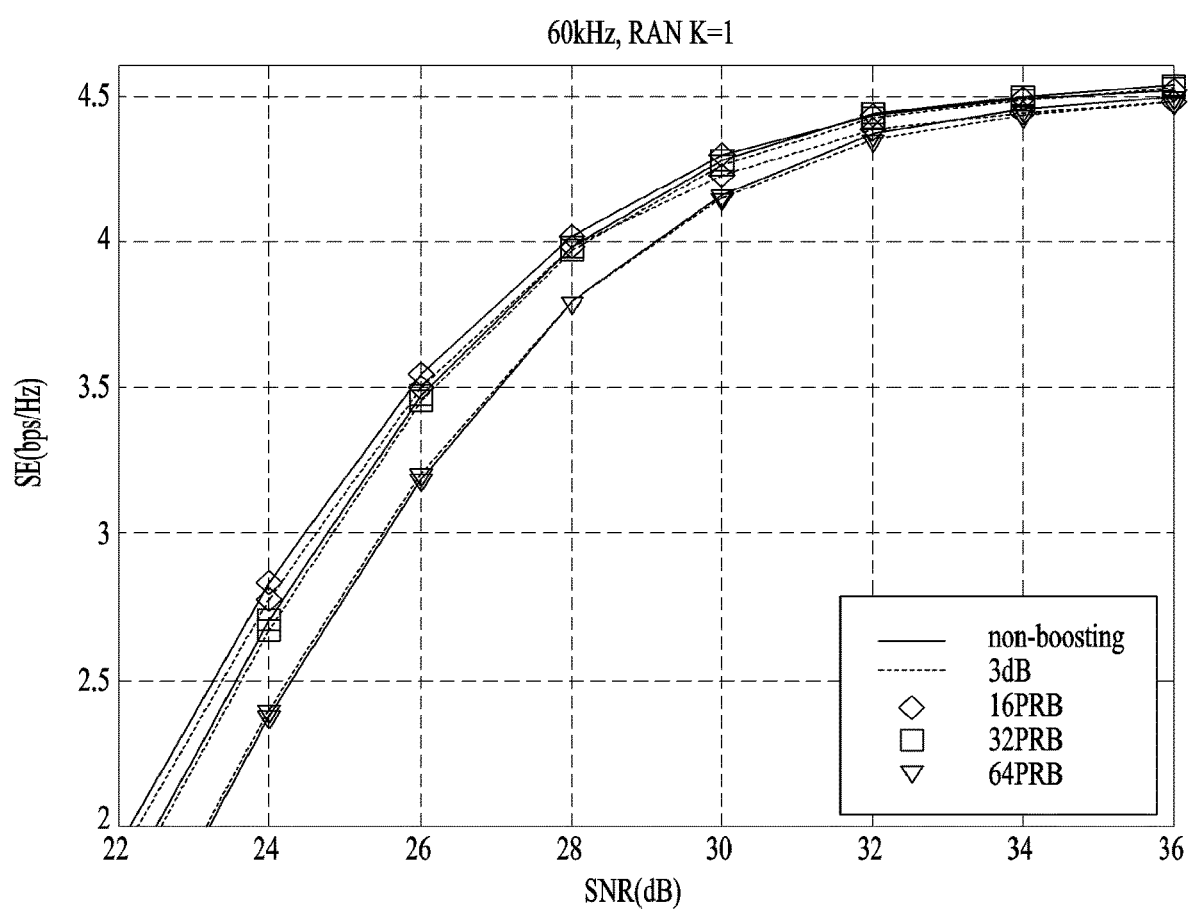
FIG. 16 is a diagram illustrating spectral efficiency (SE) per signal to noise ratio (SNR) when non-boosting or 3 dB boosting is applied to the PT-RS on 16/32/64 PRBs.
Figure 17:
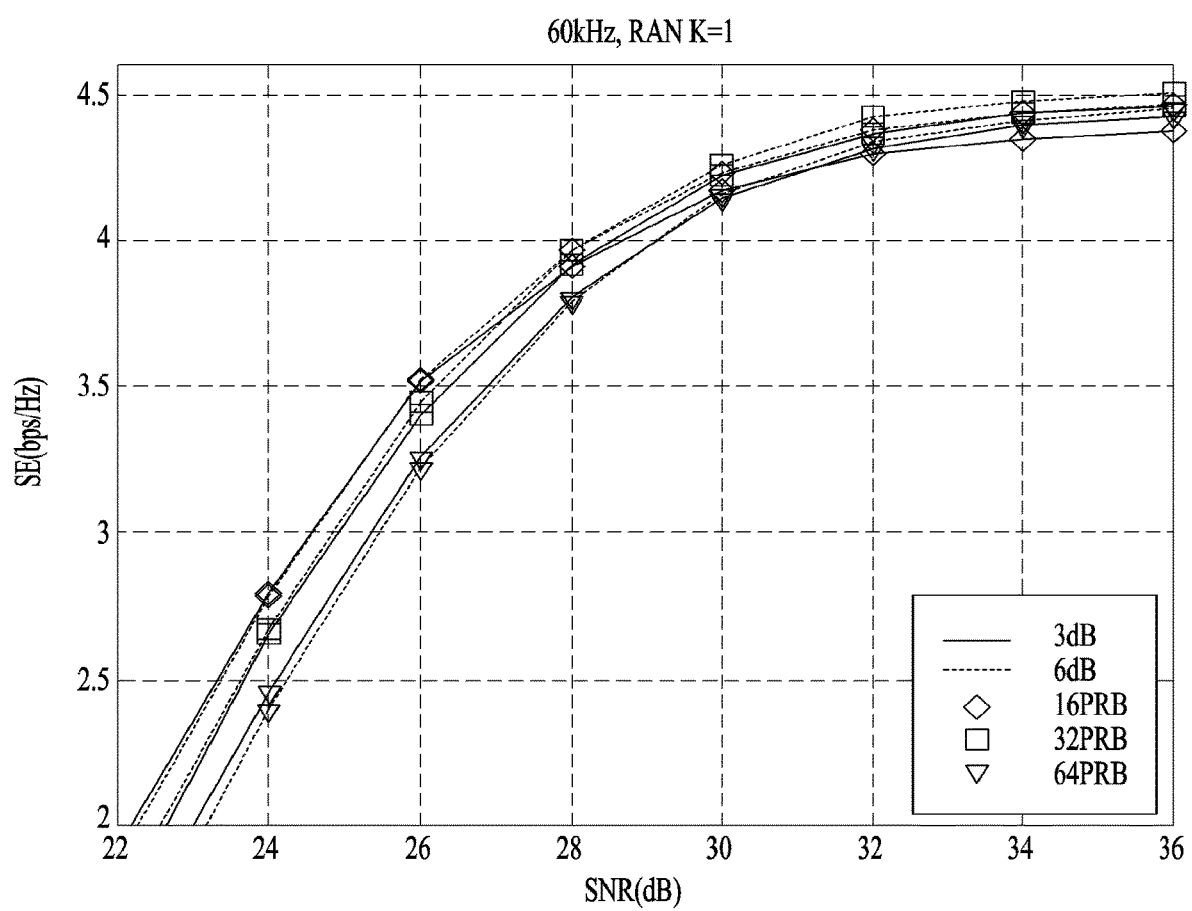
FIG. 17 is a diagram illustrating SE per SNR when 3 dB boosting or 6 dB boosting is applied to the PT-RS on 16/32/64 PRBs.

FIG. 16 is a diagram illustrating spectral efficiency (SE) per signal to noise ratio (SNR) when non-boosting or 3 dB boosting is applied to the PT-RS on 16/32/64 PRBs, and FIG. 17 is a diagram illustrating SE per SNR when 3 dB boosting or 6 dB boosting is applied to the PT-RS on 16/32/64 PRBs.

In FIG. 16, it is assumed that the number of PT-RS subcarriers in which the non-boosted PT-RS is transmitted on 16/32/64 PRBs is 8/8/16, respectively, and the number of PT-RS subcarriers in which the 3 dB-boosted PT-RS is transmitted on 16/32/64 PRBs is 4/4/8, respectively. In addition, in FIG. 17, it is assumed that the number of PT-RS subcarriers in which the 3 dB-boosted PT-RS is transmitted on 16/32/64 PRBs is 4/4/8, respectively, and the number of PT-RS subcarriers in which the 6 dB-boosted PT-RS is transmitted on 16/32/64 PRBs is 2/2/4, respectively. That is, when either 3 dB boosting or 6 dB boosting is applied, the number of PT-RS subcarriers may be reduced by ½ or ¼ compared to non-boosting.

If the number of FDMed PT-RS ports is 2/4, the maximum power boosting is 3/6 dB, Referring to FIGS. 16 and 17, it can be seen in the case of 3 dB boosting, the RS overhead decreases and the CPE estimation performance is equal to that of non-boosting. In addition, it can also be checked that when 3 dB boosting is applied, it is possible to obtain an additional throughput gain due to the decrease in the RS overhead. In particular, when the amount of the RS overhead is relatively large like 16 PRBs, the throughput gain becomes larger As shown in FIG. 17, when 6 dB boosting is applied, the performance is almost similar to that of 3 dB boosting.

Meanwhile, in the simulation of FIGS. 16 and 17, it is assumed that when 6 dB boosting is applied, the RS overhead of one PT-RS port is reduced by ¼. Accordingly, if the one PT-RS port is FDMed with a different PT-RS port, the RS overhead of the different PT-RS port can also be reduced by ¼. Thus, it is possible to obtain an additional throughput gain.

The following table shows the frequency density in accordance with scheduled BW and power boosting level.

TABLE 11

| Scheduled BW | Frequency density (0 dB or FDMed # of PT-RS ports = 1) | Frequency density (3 dB or FDMed # of PT-RS ports = 2) | Frequency density (6 dB or FDMed # of PT-RS ports = 4) |
|---|---|---|---|
| $N_{RB} < 8$ | 1 | 1/2 | 1/4 |
| $8 \leq N_{RB} < 32$ | $8/N_{RB}$ | $4/N_{RB}$ | $2/N_{RB}$ |
| $32 \leq N_{RB} < 48$ | $12/N_{RB}$ | $6/N_{RB}$ | $3/N_{RB}$ |
| $48 \leq N_{RB} < 64$ | $16/N_{RB}$ | $8/N_{RB}$ | $4/N_{RB}$ |
| $64 \leq N_{RB} < 80$ | $20/N_{RB}$ | $10/N_{RB}$ | $5/N_{RB}$ |
| $80 \leq N_{RB}$ | $24/N_{RB}$ | $12/N_{RB}$ | $6/N_{RB}$ |

In this case, 0/3/6 dB means relative power boosting level to EPRE (energy per RE) (e.g., average energy of PDSCH data REs). In the case of 0 dB, the EPRE of the PT-RS may be equal to that of the PDSCH.

As shown in Table 11. the power boosting level can be represented by the number of FDMed PT-RS ports. In the case of FDMed # of PT-RS port=3, 5, 6, 7, 8, the UE may interpret that each case correspond to FDMed # of PT-RS port=2, 4, 4, 4 in Table 11.

For example, when Table 11 defines only two columns (e.g., 0 dB and 3 dB) (that is, when the 6 dB of power boosting level is not defined), it can be assumed that all cases where the number of FDMed PT-RS ports is equal to or more than 2 are mapped to the second column (i.e., the case where the power boosting level is set to 3 dB).

When the eNB signals to the UE the power boosting level e.g., 0/3/6 dB), the transmitter may reduce the number of PT-RS subcarriers as shown in Table 11 (e.g., For $N_{RB}$=8, 8 ->4 ->2) or the PT-RS frequency density (e.g., For $N_{RB}$=7, 1 ->1/2 ->1/4).

Alternatively, the receiver may implicitly select a column from Table 11 based on the number of FDMed PT-RS ports.

3A, Fourth Proposal

In the present invention, PT-RSs are transmitted on different frequencies via a plurality of PT-RS ports. In this case, if PT-RSs transmitted via different DM-RS port groups are orthogonal to each other, each DM-RS port group considers the REs used by other DM-RS port groups for PT-RS transmission to be null. In this case, the corresponding DM-RS port group may use power for the null RE for other REs.

For example, when a plurality of PT-RS ports have different time densities and when among the plurality of PT-RS ports, only one PT-RS port has the highest time density, power boosting may not be applied to the PT-RS port with the highest time density.

Figure 18:
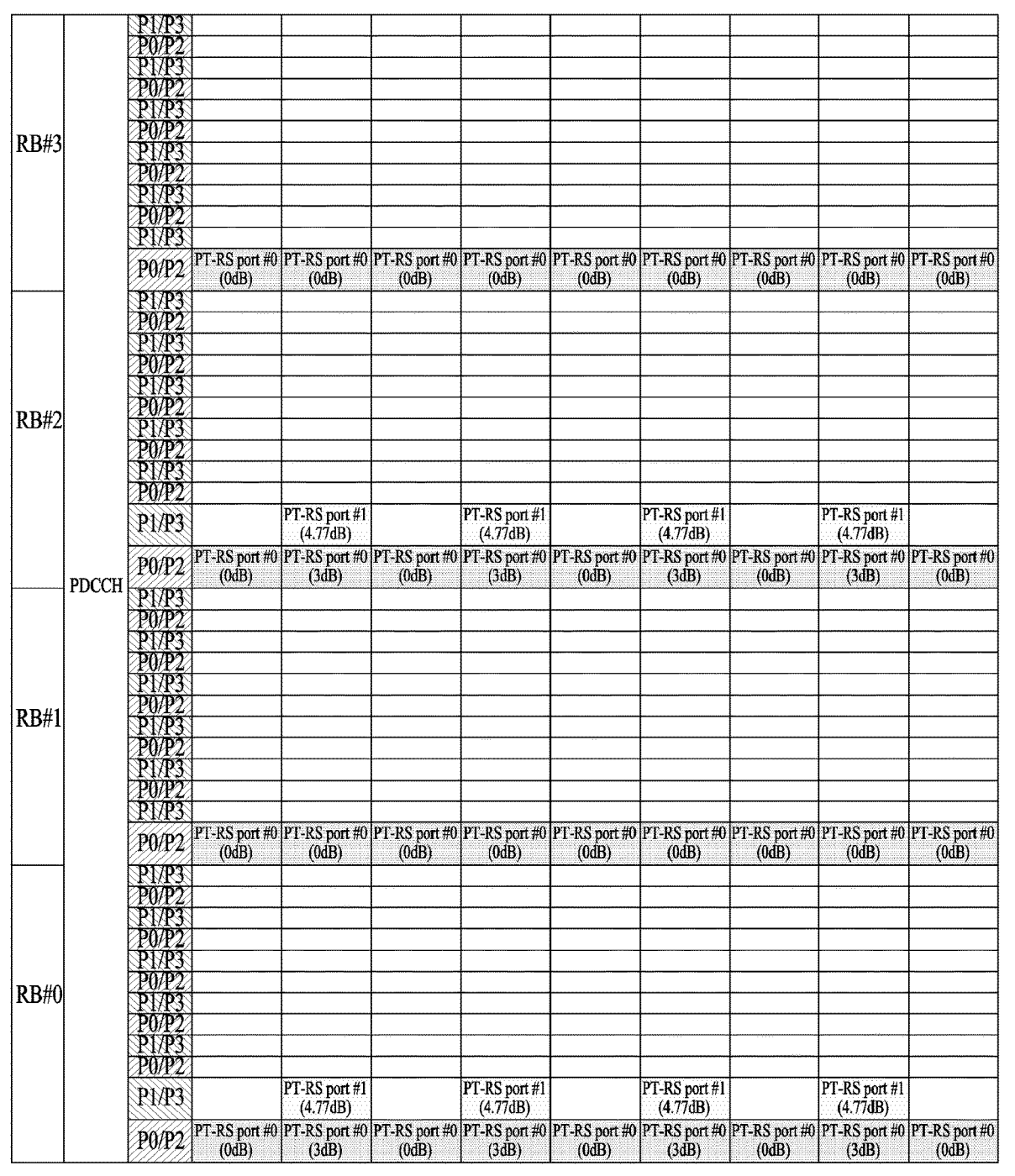

FIG. 18 is a diagram schematically illustrating an example where PT-RSs are transmitted through PT-RS ports #0 and #1 with different time densities.

As shown in FIG. 18, if two PT-RS ports (e.g., PT-RS ports #0 and #1) have different time densities, in the case of PT-RS port #0, power boosting cannot be applied to OFDM symbols where FDM is not applied.

Accordingly, the number of PT-RS subcarriers of PT-RS port #0 can be maintained as it is. In other words, the number of PT-RS subcarriers of PT-RS port #0 cannot be reduced compared to the existing configuration.

Meanwhile, the power boosting can be applied to PT-RS port #1. Accordingly, in the case of PT-RS port #1, the number of PT-RS subcarriers can be reduced compared to the existing configuration.

Consequently, in the case of PT-RS port #0, since it is unable to obtain a gain from the power boosting, the power boosting is not applied. Therefore, the number of PT-RS subcarriers can be maintained as it is. On the contrary, the power boosting can be applied to PT-RS port #1, and it is possible to reduce the number of PT-RS subcarriers based on Table 11.

As another example, if a plurality of PT-RS ports have different time densities, all PT-RS ports may transmit PT-RS with the highest PT-RS time density.

Figure 19:
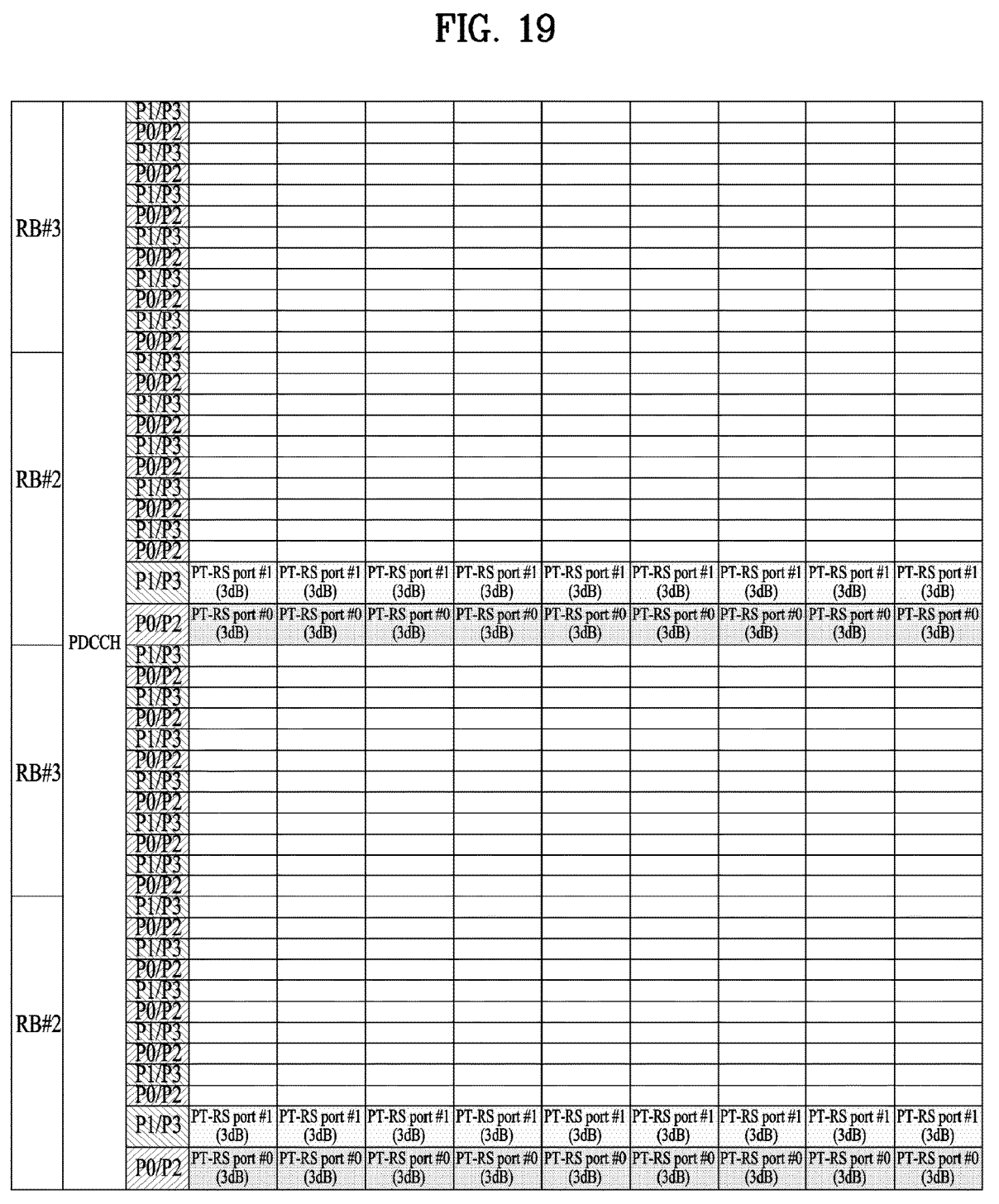

FIG. 19 is a diagram schematically illustrating another example where PT-RSs are transmitted through PT-RS ports #0 and #1 with different time densities.

As shown in FIG. 19, PT-RS port #1 can transmit a PT-RS according to time pattern #1, Which is the time density of PT-RS port #0, even though it should transmit the PT-RS using time pattern #2 (according to the configuration).

In this case, for PT-RS port #0, power boosting can be applied to all symbols, and thus the number of PT-RS subcarriers can be reduced by ½ compared to the existing configuration. Therefore, compared to FIGS. 17 and 18, it can be seen that the total number of PT-RS subcarriers is reduced from 44 to 36.

According to this configuration, when PT-RS time densities used by other PT-RS ports is switched to the highest PT-RS time density among the plurality of PT-RS ports, the power boosting can be applied to all PT-RS ports. By doing so, the PT-RS overhead can be further reduced.

To signal the above-described configuration, DCI can be used.

For example, by considering signaling overhead, the eNB may inform whether the power boosting is applied or not using 1-bit information, In this case, the power boosting level may be configured via higher layer signaling or pre-configured by a certain rule in 3GPP specifications.

As a particular example, the eNB may configure whether 3 dB boosting is applied or not through RRC or MAC-CE. If it is indicated through DCI that the power boosting is activated, the transmitter and receiver can obtain the corresponding PT-RS frequency density from the frequency density (3dB) column in Table 11.

As another example, based on the number of FDMed PT-RS ports, the transmitter and receiver may select a corresponding frequency density column from Table 11.

According to the above-described configuration, the eNB can dynamically configure, for the UE, whether the power boosting will be applied. In addition, the eNB can (dynamically) adjust the power boosting level while maintaining the signaling overhead.

Figure 20:
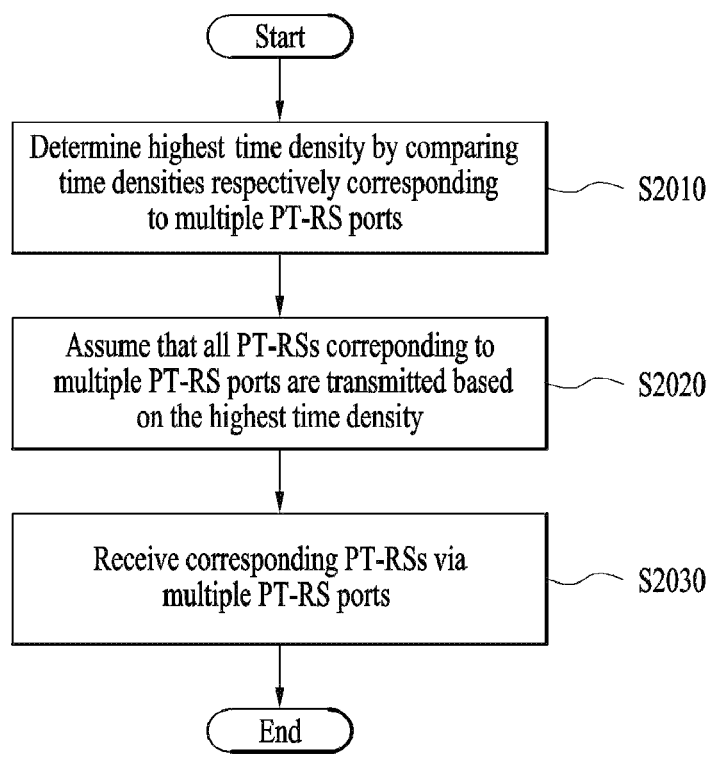
FIG. 20 is a flowchart illustrating a method by which a UE perform PT-RS reception according to the present invention.

FIG. 20 is a flowchart illustrating a method by which a UE perform PT-RS reception according to the present invention.

First, a UE determines the highest time density by comparing time densities respectively corresponding to a plurality of PT-RS ports allocated to the UE [S2010].

Next, the UE assumes that all PT-RSs corresponding to the plurality of PT-RS ports are transmitted based on the highest time density [S2020], and then receives the corresponding PT-RSs via the plurality of PT-RS ports, respectively [S2030]. In other words, the UE receive the PT-RSs corresponding to the plurality of PT-RS ports, which are transmitted based on the determined highest time density, via the plurality of PT-RS ports, respectively.

In this case, each of the time densities of the plurality of PT-RS ports may have one of the following values: one PT-RS symbol per symbol, one PT-RS symbol every two symbols, or one PT-RS symbol every four symbols. That is, one of the patterns shown in FIG. 11 may be determined as the time density. In this case, the PT-RS symbol means a symbol in which the PT-RS is transmitted.

The time densities respectively corresponding to the plurality of PT-RS ports can be determined based on modulation and coding schemes (MCSs) for respective PT-RS ports.

In this case, the determined highest time density may be a time density corresponding to the highest MCS among the MCSs for the plurality of PT-RS ports.

In addition, the number of PT-RS ports may be two, and the two PT-RS ports may correspond to different DM-RS port groups, respectively. In this case, each of the DM-RS port groups may correspond to one PT-RS port and one codeword.

For example, the different DM-RS port groups may correspond to different transmission reception points (TRPs), respectively.

In addition, the LIE may receive downlink control information (DCI) including information on modulation and coding schemes (MCSs) for the different DM-RS port groups. In this case, the DCI may be received via one of the two TRPs corresponding to the different DM-RS ports.

In this configuration, each of the frequency densities of the PT-RSs corresponding to the plurality of PT-RS ports is determined based on bandwidth scheduled for a corresponding PT-RS port and power boosting level for the corresponding PT-RS port. In this case, 0 dB (decibel) power boosting, 3 dB power boosting, or 6 dB power boosting can be applied to PT-RSs corresponding to PT-RS ports having other time densities rather than the highest time density based on signaling, and then the PT-RSs can be received. In this case, for example, RRC signaling or DCI can be used.

In this case, if bandwidth scheduled for a first PT-RS port among the plurality of PT-RS ports is equal to that scheduled for a second PT-RS port among the plurality of PT-RS ports, and if power boosting level for the first PT-RS port is different from that for the second PT-RS port, PT-RSs corresponding to the first and second PT-RS ports may have different frequency densities.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the eNB to the UE through a predefined signal (e.g., physical layer signal, higher layer signal, etc.).

4. Device Configuration

FIG. 21 is a diagram illustrating configurations of a UF, and a base station capable of being implemented by the embodiments proposed in the present invention. The UE and BS illustrated in FIG. 21 operate to implement the above-described embodiments of the PT-RS transmission and reception method therebetween.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

With the above-described configuration, the UE 1 determines the densest (or highest) time density by comparing time densities respectively corresponding to a plurality of PT-RS ports allocated to the UE through the processor 40. Thereafter, the UE 1 receive PT-RSs corresponding to the plurality of PT-RS ports, which are transmitted based on the determined densest time density, through the receiver 20 including the plurality of PT-RS ports.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 21 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method performed by a user equipment (UE) in a wireless communication system, the method comprising:
   receiving a first phase tracking reference signal (PT-RS) related to a first PT-RS port among two PT-RS ports allocated to the UE; and
   receiving a second PT-RS related to a second PT-RS port among the two PT-RS ports,
   wherein the first PT-RS and the second PT-RS are received based on a configured time density related to a higher modulation coding scheme (MCS) among a plurality of MCSs respectively related to the first PT-RS port and the second PT-RS port.

2. The method of claim 1, wherein a value of the time density is one of: one PT-RS symbol per symbol, one PT-RS symbol per two symbols, or one PT-RS symbol per four symbols.

3. The method of claim 2, wherein the two PT-RS ports are related to different demodulation reference signal (DM-RS) port groups, respectively.

4. The method of claim 3, wherein the different DM-RS port groups correspond to different transmission reception points (TRPs), respectively.

5. The method of claim 1, wherein information related to the plurality of MCSs are received via downlink control information (DCI).

6. A user equipment (UE) configured to operate in a wireless communication system, the UE comprising:
   a transceiver; and
   at least one processor coupled with the transceiver, wherein the at least one processor is configured to:
   receive a first phase tracking reference signal (PT-RS) related to a first PT-RS port among two PT-RS ports allocated to the UE; and
   receive a second PT-RS related to a second PT-RS port among the two PT-RS ports, and
   wherein the first PT-RS and the second PT-RS are received based on a configured time density related to a higher modulation coding scheme (MCS) among a plurality of MCSs respectively related to the first PT-RS port and the second PT-RS port.

7. An apparatus configured to operate in a wireless communication system, the apparatus comprising:
- at least one processor; and
- at least one computer memory operably connectable to the at least one processor and storing instructions that, when executed, cause the at least one processor to perform operations comprising:
- receiving a first phase tracking reference signal (PT-RS) related to a first PT-RS port among two PT-RS ports allocated to the apparatus; and
- receiving a second PT-RS related to a second PT-RS port among the two PT-RS ports,
- wherein the first PT-RS and the second PT-RS are received based on a configured time density related to a higher modulation coding scheme (MCS) among a plurality of MCSs respectively related to the first PT-RS port and the second PT-RS port.

* * * * *